(12) United States Patent
Jensen et al.

(10) Patent No.: US 9,380,300 B1
(45) Date of Patent: Jun. 28, 2016

(54) ENCODING LOCATION INFORMATION IN ALPHA CHANNELS FOR HTML REMOTE CONTROL

(71) Applicant: Crimson Corporation, Dover, DE (US)

(72) Inventors: David Aaron Jensen, South Jordan, UT (US); Donald Saxby, South Jordan, UT (US)

(73) Assignee: Crimson Corporation, Dover, DE (US)

( * ) Notice: Subject to any disclaimer, the term of this patent is extended or adjusted under 35 U.S.C. 154(b) by 112 days.

(21) Appl. No.: 14/068,830

(22) Filed: Oct. 31, 2013

(51) Int. Cl.
*G06K 9/46* (2006.01)
*H04N 19/467* (2014.01)
*H04N 19/182* (2014.01)

(52) U.S. Cl.
CPC ... *H04N 19/00557* (2013.01); *H04N 19/00303* (2013.01)

(58) Field of Classification Search
None
See application file for complete search history.

(56) References Cited

U.S. PATENT DOCUMENTS

| | | | | |
|---|---|---|---|---|
| 5,373,566 A * | 12/1994 | Murdock | | 382/156 |
| 6,665,342 B1 * | 12/2003 | Brown et al. | | 375/240.16 |
| 8,922,628 B2 * | 12/2014 | Bond | | H04N 13/0495 345/419 |
| 9,030,709 B2 * | 5/2015 | Shimohira | | G06F 3/1206 358/1.13 |
| 9,105,088 B1 * | 8/2015 | Petrie | | G06T 5/002 |
| 2005/0213827 A1 * | 9/2005 | Chen et al. | | 382/232 |
| 2007/0296736 A1 * | 12/2007 | Hunt | | 345/629 |
| 2008/0016155 A1 * | 1/2008 | Khalatian | | 709/204 |
| 2008/0177769 A1 * | 7/2008 | Albert et al. | | 707/101 |
| 2009/0119365 A1 * | 5/2009 | Tomic | | 709/203 |
| 2011/0176739 A1 * | 7/2011 | Strom et al. | | 382/233 |
| 2012/0121175 A1 * | 5/2012 | Narayanan et al. | | 382/166 |
| 2014/0177957 A1 * | 6/2014 | Clark | | 382/166 |

* cited by examiner

*Primary Examiner* — Bhavesh Mehta
*Assistant Examiner* — Narek Zohrabyan
(74) *Attorney, Agent, or Firm* — Austin Rapp & Hardman

(57) ABSTRACT

A method for sending a screen image by a computing device is described. A modification image representing a modified region of the screen image is determined. The modification image has a lossless format. Location information is encoded in one or more alpha channels of the modification image. The modification image is sent.

28 Claims, 11 Drawing Sheets

ENCODING LOCATION INFORMATION IN ALPHA CHANNELS FOR HTML REMOTE CONTROL

TECHNICAL FIELD

The present disclosure relates generally to computers and computer-related technology. More specifically, the present disclosure relates to encoding location information in alpha channels of a modification image for HTML remote control.

BACKGROUND

The use of electronic devices has become increasingly prevalent in modern society. As the cost of electronic devices has declined and as the usefulness of electronic devices has increased, people are using them for a wide variety of purposes. For example, many people use electronic devices to perform work tasks as well as to seek entertainment. One type of an electronic device is a computer.

Computer technologies continue to advance at a rapid pace. Computers commonly used include everything from hand-held computing devices to large multi-processor computer systems. These computers include software, such as applications including user interfaces, in order to make them useful and accessible to an end user. Computers are increasingly linked with other computers through networks. With the expansion of computer technology, the size of networks has continued to increase. Networks may link computers together that are a great distance apart.

One of the challenges with large networks is remote control of electronic devices that are connected to the network. For example, a user may desire to connect to and operate an electronic device at a remote location. One challenge associated with remote control is transferring the screen image of the electronic device at a remote location. As can be observed from this discussion, systems and methods for encoding location information in alpha channels of a modification image for HTML remote control may be beneficial.

DETAILED DESCRIPTION

Figure 1:
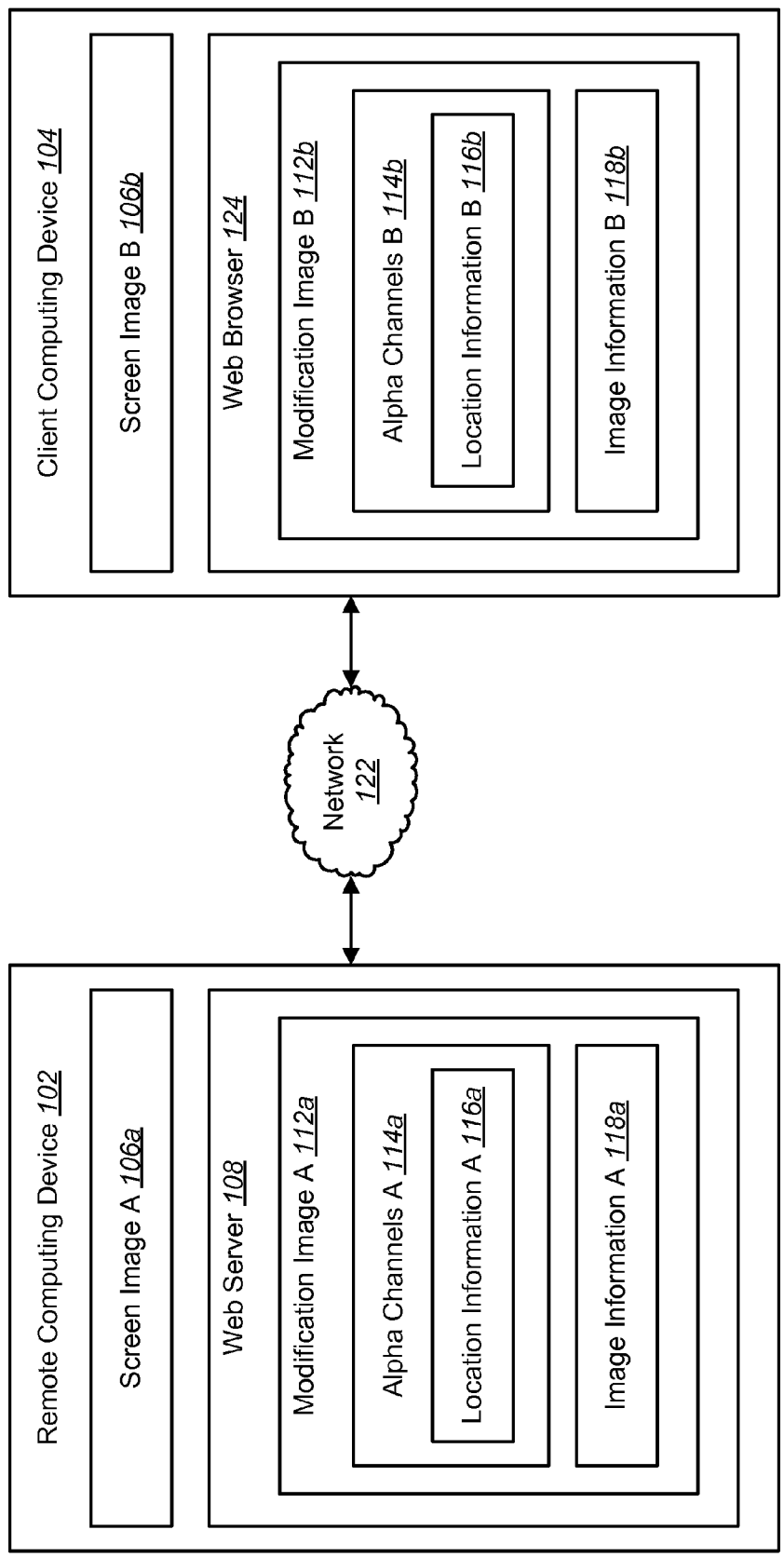
FIG. 1 is a block diagram that illustrates one configuration of computing devices in which systems and methods for sending and receiving a screen image may be implemented.

A method for sending a screen image by a computing device is described. A modification image representing a modified region of the screen image is determined. The modification image has a lossless format. Location information is encoded in one or more alpha channels of the modification image. The modification image is sent.

The encoding may include encoding location information in a first row of pixels in the modification image. The location information may be encoded in an alpha channel of at least one pixel in the first row. The first row of pixels may be added to the modification image. Color components for each pixel in the first row may be set to zero.

The encoding may further include associating the location information with a first canvas element. Image information may be associated with a second canvas element.

The location information may include a horizontal offset and a vertical offset from a reference point. The modification image may be a portable network graphics (PNG) image.

The method may further include determining which pixels are unchanged in the screen image. Changed pixels may be sent as opaque pixels and unchanged pixels may be sent as transparent pixels.

The method may be performed by a web server. The web server may include a remote control agent.

A method for receiving a screen image by a computing device is also described. A modification image representing a modified region of the screen image is received. The modification image has a lossless format. Location information in one or more alpha channels of the modification image is decoded. The modification image is displayed based on the location information.

The decoding may include decoding location information in a first row of pixels in the modification image. The location information may be decoded from an alpha channel of at least one pixel in the first row. The first row of pixels may be added to the modification image. Color components for each pixel in the first row may be set to zero.

The decoding may further include adding the location information to a first canvas element. Image information may be added to a second canvas element. The location information may include a horizontal offset and a vertical offset from a reference point. The modification image may be a portable network graphics (PNG) image.

The method may further include receiving changed pixels as opaque pixels and unchanged pixels as transparent pixels. The method may be performed by a web browser. The modification image may be received from a remote control agent.

A computing device for sending a screen image is also described. The computing device includes a processor, memory in electronic communication with the processor and instructions stored in the memory. A modification image representing a modified region of the screen image is determined. The modification image has a lossless format. Location information is encoded in one or more alpha channels of the modification image. The modification image is sent.

A computing device for receiving a screen image is also described. The computing device includes a processor, memory in electronic communication with the processor and instructions stored in the memory. A modification image representing a modified region of the screen image is received. The modification image has a lossless format. Location information in one or more alpha channels of the modification image is decoded. The modification image is displayed based on the location information.

The systems and methods disclosed herein describe computing devices for sending and receiving a screen image. In some cases, a user may desire to view the screen image of a remotely located computing device (e.g., a remote computing device) on a client computing device accessible to the user. Some applications in which sending and receiving a screen image may be beneficial include remote control of a computing device, remote desktop visualization, remote access, collaboration and meeting tools, administration, and remote assistance and troubleshooting tools. As used herein, the term "remote control" refers to sending a screen image from a remote computing device to a client computing device and displaying the screen image on the client computing device.

Remote control may also include operating the remote computing device from the client computing device based on the transferred screen image. For example, the client computing device may receive the screen images of the remote computing device. A user may then control the remote computing device by using a mouse, keyboard, touch screen, a web browser or other user interfaces connected to the client computing device.

A known approach to remote control requires the installation of a stand-alone software program on the client and remote computing devices. In this approach, a software program must be downloaded and installed on both the client and remote computing devices before a screen image may be sent from the remote computing device and displayed on the client computing device. However, when a client computing device does not have the software program installed, this approach requires a lengthy installation process.

Other known approaches to remote control utilize existing web browsers. In one approach, remote control may be implemented by installing a plugin for a web browser on the client computing device. A plugin is native code that is browser-specific. The plugin may allow the client computing device to receive and display screen images from a remote computing device through a web browser. However, because a plugin is code that is browser-specific, different versions of the plugin must be developed for each type of web browser. Furthermore, a plugin requires a separate installation procedure.

In another approach to remote control utilizing existing web browsers, a remote control program may be written in Java and embedded as a Java applet that may be displayed in a web browser of the client computing device. However, this approach also requires a separate installation of code (e.g., Java Virtual Machine) to execute the Java applet on the client computing device.

In yet another approach to remote control utilizing existing web browsers, the entire screen of the remote computing device is updated in a web browser. For example, a web server may send the entire screen image of the remote computing device to be displayed in a web browser on the client computing device. This approach has been used in cases where the screen of the remote computing device is small (e.g., a cell phone screen or smart phone screen). However, for larger screen sizes (e.g., the screen of a personal computer, for instance) the amount of data required to update the entire screen image in true color (e.g., 24 bits per pixel) is large. This may result in slow remote control performance and a poor user experience.

To improve the performance of remote control, the regions of the screen that have changed since the last screen update may be sent, instead of sending an image of the entire screen. For example, a web server may compress and transmit small modification images of parts of the screen. A web browser receiving the modification images may know the width and height of the modification image. However, the web browser may not know the location of modification relative to the screen. For instance, the web browser may not know the horizontal and vertical offsets (e.g., x-y offset) of the modification image. A web browser could make a separate request to the web server to obtain location information, but this approach may decrease performance of the overall system. The systems and methods described herein provide ways to encode the location information of the modification image without extra requests to the web server.

The systems and methods disclosed herein provide for remote control in a web browser. In one approach, the remote computing device may include a web server that operates as a remote control agent. The web server may determine a small image (e.g., modification image) that represents a modified region of the screen on the remote computing device. The web server may encode this modification image with location information that indicates where the modification image is located in the screen image. The location information may be encoded in one or more alpha channels of the modification image. The remote computing device may send the modification image to a browser running on the client computing device. The browser may decode the location information in the alpha channels and display the modification image based on the location information.

Various configurations of the systems and methods are now described with reference to the Figures, where like reference numbers may indicate identical or functionally similar elements. The configurations of the present systems and methods, as generally described and illustrated in the Figures herein, could be arranged and designed in a wide variety of different configurations. Thus, the following more detailed description of several configurations, as represented in the Figures, is not intended to limit the scope of the systems and methods, as claimed, but is merely representative of the various configurations of the systems and methods.

FIG. 1 is a block diagram that illustrates one configuration of computing devices 102, 104 in which systems and methods for sending and receiving a screen image 106 may be implemented. Examples of a remote computing device 102 and/or a the client computing device 104 include, but are not limited to, desktop computers, laptop computers, servers, supercomputers, tablet devices, cellular phones, smartphones, gaming systems and any other computing device. It should be noted that while FIG. 1 depicts two computing devices 102, 104, the systems and methods disclosed herein may be applied to any number of computing devices 102, 104. The remote computing device 102 may include a remote screen image 106 and/or a web server 108. In an alternative implementation, the web server 108 may be separate from and coupled to the remote computing device 102. The client computing device 104 may include a client screen image 106 and/or a web browser 124. In some instances, the remote computing device 102 may communicate with the client computing device 104 via a network 122.

It should be noted that one or more of the elements depicted as included within the remote computing device 102 and/or the client computing device 104 may be implemented in hardware, software or a combination of both. For example, the web server 108 may be implemented in hardware, software or a combination of both.

The web server 108 may determine modification image A 112*a*. Modification image A 112*a* may represent a modified region of screen image A 106*a*. For example, modification image A 112*a* may be a group of pixels that correspond to areas of the screen that have just changed. In one configuration, modification image A 112*a* may be a rectangle of pixels. For instance, if text is typed into the remote computing device 102, the web server 108 may determine that modification image A 112*a* includes a rectangle for the new characters that were just typed.

In one configuration, modification image A 112*a* may have a lossless format. An image with a lossless format may be compressed with a data compression algorithm that results in the original data being reconstructed from the compressed data. Therefore, modification image A 112*a* may be preserved after compression and decompression. In one configuration, modification image A 112*a* may have a portable network graphics (PNG) format. It should be noted that an image with a PNG format may be referred to as a PNG image.

Each pixel in an image may have a certain number of channels depending on the image type. For example, an RGBA image (e.g., true color image) has four channels: red, green, blue and alpha channels. Three channels (e.g., red, green and blue) may be used to express color information. The alpha channel 114 may express transparency information. For grayscale images, two channels may be used: a grayscale channel and an alpha channel. The grayscale channel may express the intensity of the pixel between black and white. In one configuration, each of the channels may use 8 bits (e.g., one byte) of information. In other configurations, more or fewer bits may be used per channel.

An alpha channel 114 may be used to store transparency information (or opacity information) of a pixel in an image. However, the web server 108 may encode location information A 116*a* in one or more alpha channels A 114*a* of modification image A 112*a* in addition to, or instead of, the transparency information. In one configuration, location information A 116*a* may be a horizontal offset and a vertical offset (e.g., x-y offset) for modification image A 112*a* from a reference position. For example, the reference position may be a corner (e.g., top left, top right, bottom left or bottom right) of screen image A 106*a*. Location information A 116*a* may also refer to a location of modification image A 112*a* (e.g., top left, top left, top right, bottom left, bottom right, center, etc.). Therefore, location information A 116*a* may indicate that modification image A 112*a* should be displayed at a certain distance from the reference position corresponding to the horizontal offset and vertical offset.

The web server 108 may encode location information A 116*a* in one or more alpha channels A 114*a* of modification image A 112*a*. In one configuration, the web server 108 may encode location information A 116*a* in one or more alpha channels A 114*a* in a row (e.g., the first row) of pixels. In another configuration, the web server 108 may encode location information A 116*a* in one or more alpha channels A 114*a* in a column (e.g., the first column) of pixels. In yet another configuration, the web server 108 may encode location information A 116*a* in one or more alpha channels A 114*a* in a pre-determined configuration of pixels.

In one implementation, the web server 108 may encode location information A 116*a* in the first row of pixels in modification image A 112*a*. The web server 108 may add a first row of pixels to modification image A 112*a*. The web server 108 may then encode location information A 116*a* in an alpha channel A 114*a* of at least one pixel in the first row. The web server 108 may set the color components (e.g., the red, green and blue channels) for each pixel in the first row to zero. It should be noted that a web browser 124 (of the client computing device 104) may put an image through a color space transformation before displaying the image. However, during the color space transformation, the color channels (e.g., the red, green and blue values) may not be perfectly preserved. In other words, color channels may drift as a result of color space transformation in the web browser 124. But an alpha channel 114 of each pixel is accurately preserved during color space transformation. Therefore, only alpha channels 114, and not color channels, may be used to store the location information 116 to ensure that the location information 116 does not change due to color space transformation.

In another implementation, no additional pixels are added to the modification image A 112*a*. The web server 108 may encode location information A 116*a* in one or more alpha channels A 114*a* of the original modification image A 112*a*.

Upon encoding location information A 116*a* in the one or more alpha channels A 114*a*, modification image A 112*a* may include image information A 118*a* and location information A 116*a*. The image information A 118*a* may include the pixel values (e.g., RGBA values) of the modified portion of screen image A 106*a* represented by modification image A 112*a*. It should be noted that image information A 118*a* may include alpha channel 114 values corresponding to the transparency of the pixels in modification image A 112*a*. However, certain alpha channels 114 may include the additional location information A 116*a*, as described above.

The remote computing device 102 may compress modification image A 112*a* based on the image format. For example, if modification image A 112*a* has a PNG format, the remote computing device 102 may compress modification image A 112*a* using a PNG compression algorithm. Because modification image A 112*a* has a lossless format, location information A 116*a* encoded in the alpha channels A 114*a* will be preserved upon decompression (by the client computing device 104, for instance).

In one configuration, the web server 108 may associate location information A 116*a* with a first canvas element and image information A 118*a* with a second canvas element. HTML5 provides canvas elements. A canvas element is a drawable region that is be defined by HTML code. The canvas element may have height and width attributes. The first and second canvas elements may be components of a web page (e.g., HTML document) that may be sent to the client computing device 104. The web browser 124 may interpret HTML code and JavaScript code associated with the web page to determine where to display the modification image A 112*a*.

The remote computing device 102 may send modification image A 112*a* to the client computing device 104. The client computing device 104 may receive modification image B 112*b* from the remote computing device 102. If the file is transferred correctly, modification image B 112*b* is the same as modification image A 112*a*.

Modification image B 112*b* may have a lossless format. In one configuration, modification image B 112*b* may have a portable network graphics (PNG) format. Modification image B 112*b* may be compressed. Therefore, the client computing device 104 may decompress modification image B 112*b*. Because modification image B 112*b* has a lossless format, location information B 116*b* encoded in alpha channels B 114*b* will be preserved upon decompression. The client computing device 104 may provide the decompressed modification image B 112*b* to a web browser 124.

The web browser 124 may decode location information B 116*b* in one or more alpha channels B 114*b* of modification image B 112*b*. In one configuration, the web browser 124 may decode location information B 116*b* from one or more alpha channels B 114*b* in a row (e.g., the first row) of pixels.

In another configuration, the web browser 124 may decode location information B 116b from one or more alpha channels B 114b in a column (e.g., the first column) of pixels. In yet another configuration, the web browser 124 may decode location information B 116b from one or more alpha channels B 114b in a pre-determined configuration of pixels.

In one implementation, a first row of pixels may be added to modification image B 112b (by the remote computing device 102, for instance) and location information B 116b may be embedded in an alpha channel B 114b of at least one pixel in the first row. Furthermore, the color components (e.g., red, green and blue channels) for each pixel in the first row may be set to zero. In this implementation, the web browser 124 may decode the location information B 116b by first separating the first row of pixels from the remaining pixels in modification image B 112b and then extracting location information B 116b from the alpha channels B 114b in the first row of pixels. Additional examples of decoding location information B 116b are described below.

The web browser 124 may display modification image B 112b based on location information B 116b. In one configuration, location information B 116b may include a horizontal offset and a vertical offset (e.g., x-y offset) of modification image B 112b from a reference position. For example, the reference position may be a corner (e.g., top left, top right, bottom left or bottom right) of the screen image B 106b. Therefore, location information B 116b may indicate that modification image B 112b should be displayed at a certain distance from the reference position of screen image B 106b corresponding to the horizontal offset and vertical offset.

In one configuration, the web browser 124 may add location information B 116b to a first canvas element and image information B 118b to a second canvas element. The first and second canvas elements may be components of a web page (e.g., HTML document) that may be received from the remote computing device 102. The web browser 124 may interpret the HTML code and JavaScript code included with the web page to determine where to display modification image B 112b. For example, the first canvas element (containing the decoded location information B 116b) may be hidden and the second canvas element (containing image information B 118b) may be visible. JavaScript code included in the web page may reference the location information B 116b in the first canvas element and display image information B 118b included in the second canvas element at the correct location.

Figure 2:
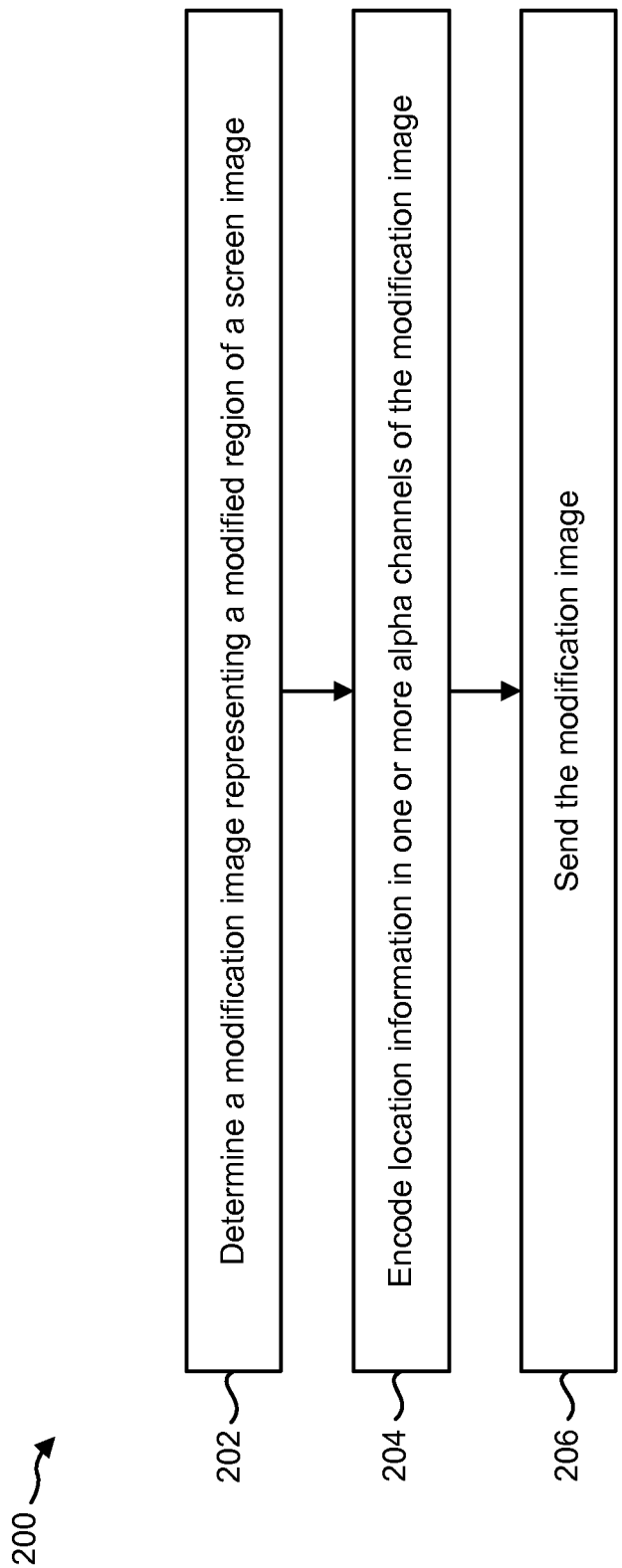
FIG. 2 is a flow diagram illustrating one configuration of a method for sending a screen image by a computing device.

FIG. 2 is a flow diagram illustrating one configuration of a method 200 for sending a screen image 106 by a computing device 102. In one configuration, the computing device 102 may be a remote computing device 102 as described above in connection with FIG. 1.

The computing device 102 may determine 202 a modification image 112. The modification image 112 may represent a modified region of the screen image 106. For example, the modification image 112 may be a group of pixels that correspond to areas of the screen that have just changed. In one configuration, the modification image 112 may be a rectangle of pixels. The modification image 112 may have a lossless format. In one configuration, the modification image 112 may have a portable network graphics (PNG) format.

The computing device 102 may encode 204 location information 116 in one or more alpha channels 114 of the modification image 112. The computing device 102 may encode 204 the location information 116 in addition to, or instead of, the transparency information of the one or more alpha channels 114. In one configuration, the location information 116 may include a horizontal offset and a vertical offset of the modification image 112 from a reference position. For example, the reference position may be a corner (e.g., top left, top right, bottom left or bottom right) of the screen image 106. Therefore, the location information 116 may indicate that the modification image 112 should be displayed at a certain distance from the reference position corresponding to the horizontal offset and vertical offset.

In one configuration, the computing device 102 may encode 204 location information 116 in one or more alpha channels 114 in a row of pixels. In another configuration, the computing device 102 may encode 204 location information 116 in one or more alpha channels 114 in a column of pixels. In yet another configuration, the computing device 102 may encode 204 location information 116 in one or more alpha channels 114 in a pre-determined configuration of pixels.

In one implementation, the computing device 102 may encode 204 the location information 116 in the first row of pixels in the modification image 112. The computing device 102 may add a first row of pixels to the modification image 112. The computing device 102 may then encode 204 the location information 116 in an alpha channel 114 of at least one pixel in the first row. The computing device 102 may set the color components (e.g., the red, green and blue channels) for each pixel in the first row to zero.

In another implementation, no additional pixels are added to the modification image 112. The computing device 102 may encode 204 the location information 116 in one or more alpha channels 114 of the original modification image 112.

The encoding 204 may also include compressing the modification image 112 based on the image format. For example, if the modification image 112 has a PNG format, the computing device 102 may compress the modification image 112 using a PNG compression algorithm. Because the modification image 112 has a lossless format, the location information 116 encoded in the alpha channels 114 will be preserved upon decompression.

The encoding 204 may further include associating the location information 116 with a first canvas element and the image information 118 with a second canvas element. The first and second canvas elements may be components of a web page (e.g., HTML document).

The computing device 102 may send 206 the modification image 112. For example, the computing device 102 may send 206 the modification image 112 to another computing device (e.g., client computing device) 104. In one configuration, the modification image 112 may be sent 206 as part of a web page. A web browser 124 may interpret HTML code and/or JavaScript code associated with the web page to determine where to display the modification image 112.

Figure 3:
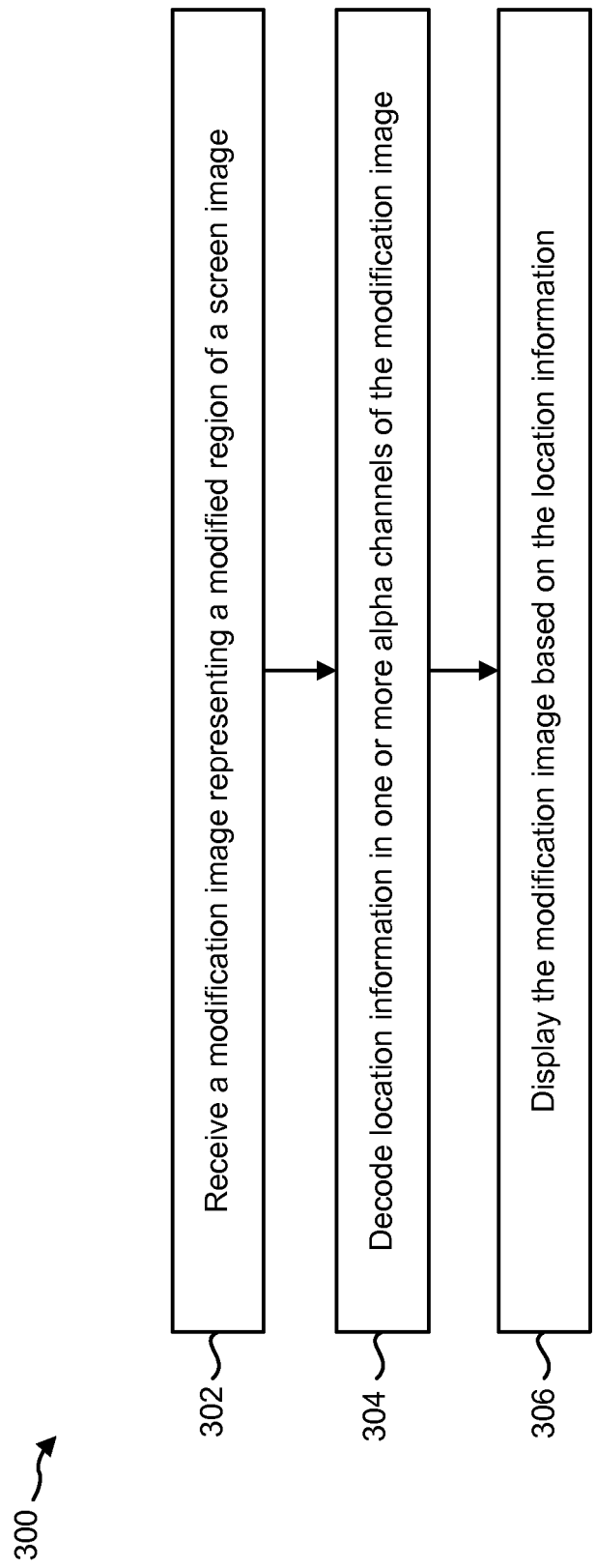
FIG. 3 is a flow diagram illustrating one configuration of a method for receiving a screen image by a computing device.

FIG. 3 is a flow diagram illustrating one configuration of a method 300 for receiving a screen image 106 by a computing device 104. In one configuration, the computing device 104 may be a client computing device 104 as described above in connection with FIG. 1. The computing device 104 may receive 302 a modification image 112. For example, the computing device 104 may receive 302 the modification image 112 from a remote computing device 102.

The modification image 112 may have a lossless format. In one configuration, the modification image 112 may have a portable network graphics (PNG) format. The modification image 112 may be compressed (by the remote computing device 102, for instance). Therefore, the computing device 104 may decompress the modification image 112.

The computing device 104 may decode 304 location information 116 in one or more alpha channels 114 of the modification image 112. In one configuration, the computing device 104 may decode 304 location information 116 from one or more alpha channels 114 in a row of pixels. In another configuration, the computing device 104 may decode 304 location information 116 from one or more alpha channels 114 in a column of pixels. In yet another configuration, the computing device 104 may decode 304 location information 116 from one or more alpha channels 114 in a pre-determined configuration of pixels.

In one implementation, a first row of pixels may be added to the modification image 112 (by the remote computing device 102, for instance) and the location information 116 may be embedded in an alpha channel 114 of at least one pixel in the first row. Furthermore, the color components (e.g., red, green and blue channels) for each pixel in the first row may be set to zero. In this implementation, the computing device 104 may decode 304 the location information 116 by first separating the first row of pixels from the remaining pixels in the modification image 112 and then extracting the location information 116 from the alpha channels 114 in the first row of pixels.

The computing device 104 may display 306 the modification image 112 based on the location information 116. In one configuration, the location information 116 may include a horizontal offset and a vertical offset of the modification image 112 from a reference position. For example, the reference position may be a corner of the screen image 106. Therefore, the location information 116 may indicate that the modification image 112 should be displayed at a certain distance from the reference position of the screen image 106 corresponding to the horizontal offset and vertical offset.

The computing device 104 may also display 306 the modification image 112 based on canvas elements. In one configuration, the computing device 104 may add the location information 116 to a first canvas element and the image information 118 to a second canvas element. The first and second canvas elements may be components of a web page (e.g., HTML document) that may be received from the remote computing device 102. The computing device 104 may interpret HTML code and/or JavaScript code included with the web page to determine where to display 306 the modification image 112. For example, the first canvas element (containing the decoded location information 116) may be hidden and the second canvas element (containing the image information 118) may be visible. JavaScript code included in the web page may reference the location information 116 in the first canvas element and display 306 the image information 118 included in the second canvas element at the correct location.

Figure 4:
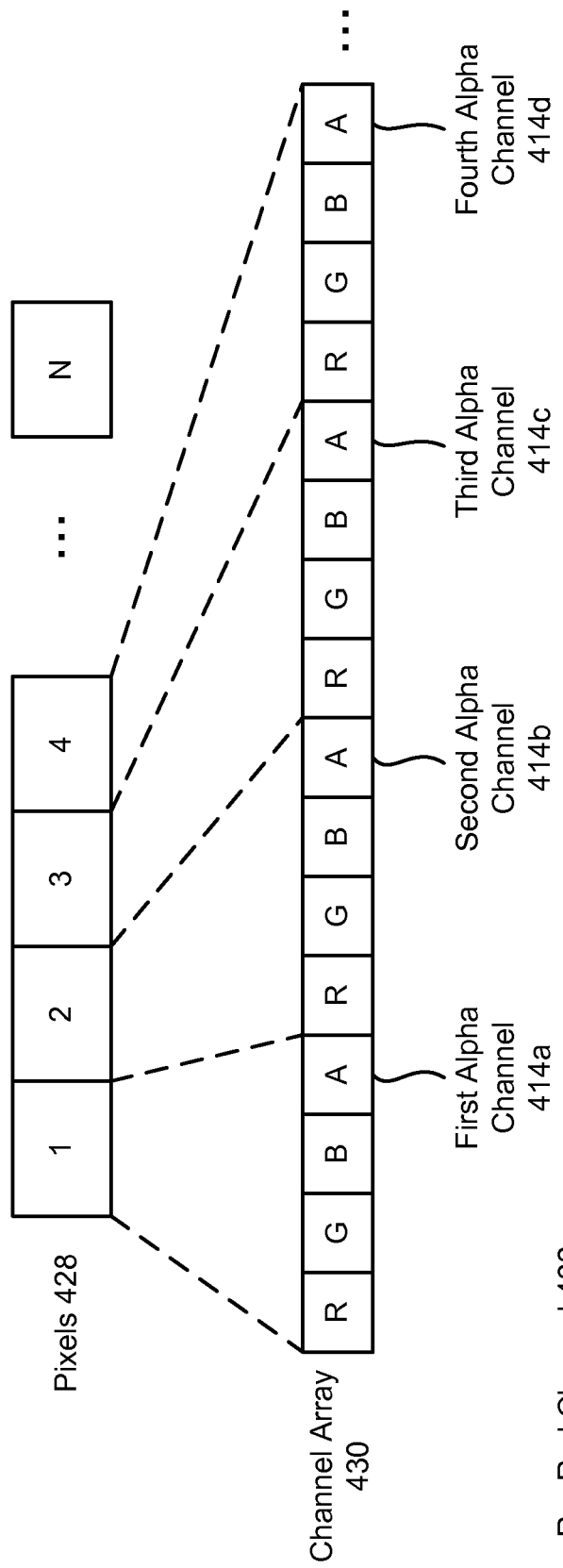
FIG. 4 is a block diagram that illustrates one configuration of pixels in which systems and methods for sending and receiving a screen image may be implemented.

FIG. 4 is a block diagram that illustrates one configuration of pixels 428 in which systems and methods for sending and receiving a screen image 106 may be implemented. The pixels 428 may be included in an image. In one configuration, the image may be a modification image 112 as described in connection with FIG. 1. The pixels 428 may be arranged in an array. In one arrangement, the pixels 428 may be a row of pixels 428 from the image. In another arrangement, the pixels 428 may be a column of pixels 428 from the image.

Each pixel 428 in an image may have a certain number of channels depending on the image format. The channels may be arranged in a channel array 430 corresponding to the pixel 428 arrangement. In the example illustrated in FIG. 4, the image has an RGBA color space. An example of an image format with an RGBA color space is a PNG image. An image with an RGBA color space may have four channels per pixel 428. Therefore, a pixel 428 may include a red channel (R) 432, a green channel (G) 434, a blue channel (B) 436 and an alpha channel (A) 414. The red channel 432, green channel 434 and blue channel 436 may be used to express color information for a pixel 428. The alpha channel 414 may express transparency information for a pixel 428. In one configuration, each of the channels 432, 434, 436, 414 may use 8 bits (e.g., one byte) of information. In other configurations, more or fewer bits may be used per channel.

According to the systems and methods described herein, location information 116 may be encoded in one or more alpha channels 414. The location information 116 may be embedded in the one or more alpha channels 414 in addition to, or instead of, transparency information. In one configuration, the location information 116 may include a horizontal offset and a vertical offset (e.g., x-y offset) of the image 112 from a reference position.

In the example illustrated in FIG. 4, each channel 432, 434, 436, 414 may use one byte. In one configuration, the horizontal offset (e.g., x-location) may be expressed using two bytes. The first alpha channel 414*a* in the channel array 430 (corresponding to the first pixel 428) may include the high order byte of the horizontal offset. The second alpha channel 414*b* in the channel array 430 (corresponding to the second pixel 428) may include the low order byte of the horizontal offset. The vertical offset (e.g., y-location) may also be expressed using two bytes. The third alpha channel 414*c* in the channel array 430 (corresponding to the third pixel 428) may include the high order byte of the vertical offset. The fourth alpha channel 414*d* in the channel array 430 (corresponding to the fourth pixel 428) may include the low order byte of the vertical offset.

In one configuration, a first row of pixels 428 may be added to the image to encode the location information 116. In this configuration, the values of the red channel 432, green channel 434 and blue channel 436 in the first row of pixels 428 may be set to zero. The location information 116 may be encoded in the one or more alpha channels 414 of the first row of pixels 428. As described above, the alpha channels 414 of the first four pixels 428 may include the location information 116. The remaining alpha channels 414 of the first row of pixels 428 may optionally include one or more additional flags that may be used in remote control operations.

Figure 5:
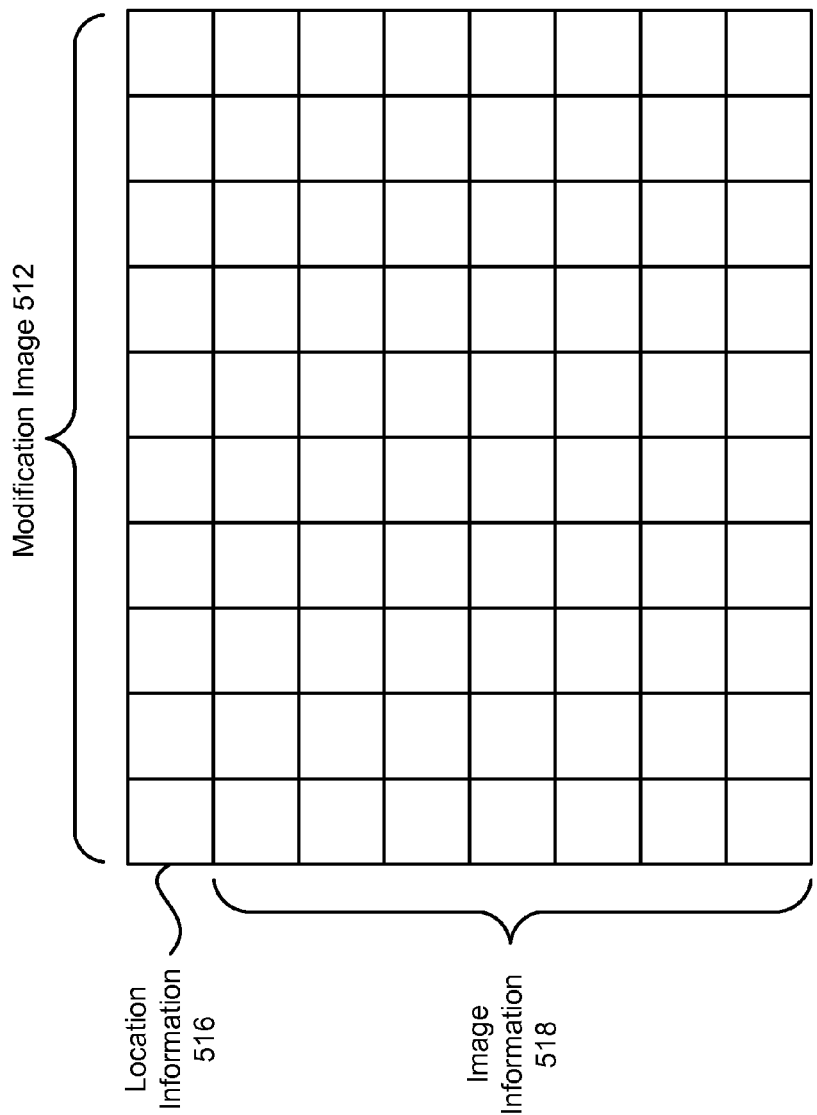
FIG. 5 is a block diagram that illustrates one configuration of a modification image in which systems and methods for sending and receiving a screen image may be implemented.

FIG. 5 is a block diagram that illustrates one configuration of a modification image 512 in which systems and methods for sending and receiving a screen image 106 may be implemented. The modification image 512 may be similar to the modification image 112 described above in connection with FIG. 1.

The modification image 512 may represent a modified region of the screen image 106. For example, the modification image 512 may be a group of pixels 428 that correspond to areas of the screen that have just changed. The modification image 512 may be a rectangle of pixels 428 that are a subset of the pixels 428 in the screen image 106. The modification image 512 may be a PNG image, or other lossless format that includes an alpha channel 114.

A first row of pixels 428 may be added to the modification image 512. Location information 516 may be encoded in one or more alpha channels 114 in the first row of pixels 428. This may be accomplished as described above in connection with FIG. 4. The modification image 512 may have a width of at least 10 pixels 428. The width of the added first row of pixels 428 is the same as the width of the modification image 512. The height of the modification image 512 may vary between a minimum height of 2 pixels 428 (corresponding to one row for the location information 516 and one row for image information 518) and the height of the screen image 106.

In another configuration, image dimensions (e.g., width and height) may be encoded in the first row of pixels 428. Image dimensions may be transmitted in the header of a PNG file independently. Therefore, a web browser 124 may inherently know the image dimensions of a PNG file. However, other image formats may not include image dimensions in the file header. For these image formats, image dimensions may be encoded in one or more alpha channels 114 in the first row of pixels 428 in addition to the location information 516.

To reduce data overhead, the values of the non-alpha channels (e.g., red channel 432, green channel 434 and blue channel 436) in the first row may be set to zero. It should be noted that a channel with a zero value does not change during color space transformation. Therefore, the location information 516 included in the alpha channels 114 of the first row of pixels 428 will not be altered by color space transformation in a web browser 124.

In this configuration, the visible region of the modification image 512 is included in the image information 518. The image information 518 may include the pixels 428 that form the visible image. It should be noted that the pixels 428 included in the image information 518 may include alpha channels 114 that express transparency information. These alpha channels 114 are in addition to the alpha channels 114 included in the first row of pixels 428 that express image information 518. The image information 518 may be displayed based on the location information 516 included in the first row of pixels 428.

Figure 6:
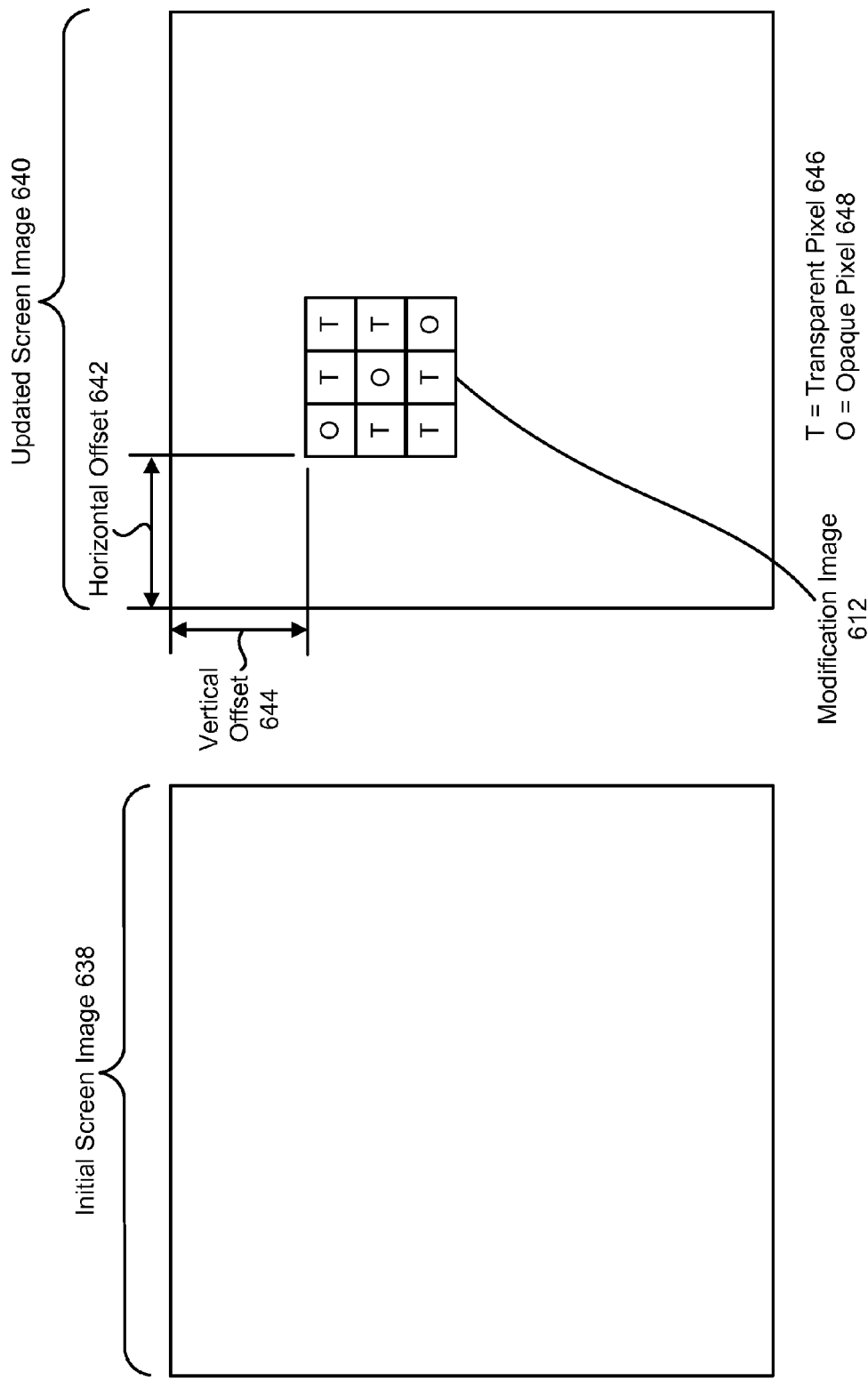
FIG. 6 is a block diagram that illustrates one configuration of an initial screen image and an updated screen image according to the systems and methods described herein.

FIG. 6 is a block diagram that illustrates one configuration of an initial screen image 638 and an updated screen image 640 according to the systems and methods described herein. The screen images 638, 640 may correspond to the screen image 106 described above in connection with FIG. 1.

A remote computing device 102 may send an initial screen image 638 to a client computing device 104. The initial screen image 638 may represent the entire screen of the remote computing device 102. The initial screen image 638 may be a PNG image that may be sent to a web browser 124 on the client computing device 104. The client computing device 104 may display the initial screen image 638 as a complete image of the screen of the remote computing device 102.

An updated screen image 640 may be created by displaying a modification image 612 over the initial screen image 638. The modification image 612 may represent a modified region of the initial screen image 638. For example, the modification image 612 may be a group of pixels 428 that correspond to areas of the screen that have just changed. The modification image 612 may also be a PNG image. It should be noted that in this example, the modification image 612 is shown as a 3×3 grid of pixels 428. However, a different configuration of pixels 428 may be used.

The modification image 612 may include location information 116 that may be used to display the modification image 612. The location information 116 may be encoded in one or more alpha channels 114 of the modification image 612. This may be accomplished as described above in connection with FIG. 4. The location information 116 may include a horizontal offset 642 and a vertical offset 644 of the modification image 612 from a reference position. In this configuration, the reference position is the top-left corner of the screen image. Furthermore, in this configuration, the horizontal offset 642 and vertical offset 644 refer to the top-left corner of the modification image 612.

A pixel 428 included in the modification image 612 may be a transparent pixel 646 or an opaque pixel 648. If a pixel 428 is unchanged from the initial screen image 638, that pixel 428 may be a transparent pixel 646 in the modification image 612. However, if a pixel 428 changes from the initial screen image 638, that pixel 428 may be an opaque pixel 648 in the modification image 612. The transparency information (e.g., whether a pixel 428 is a transparent pixel 646 or an opaque pixel 648) may be expressed in the alpha channel 114 of a pixel 428. In one implementation, only two values are used to express the transparency information. For example, one value may indicate full transparency (e.g., a transparent pixel 646) and another value may indicate no transparency (e.g., an opaque pixel 648).

Figure 7:
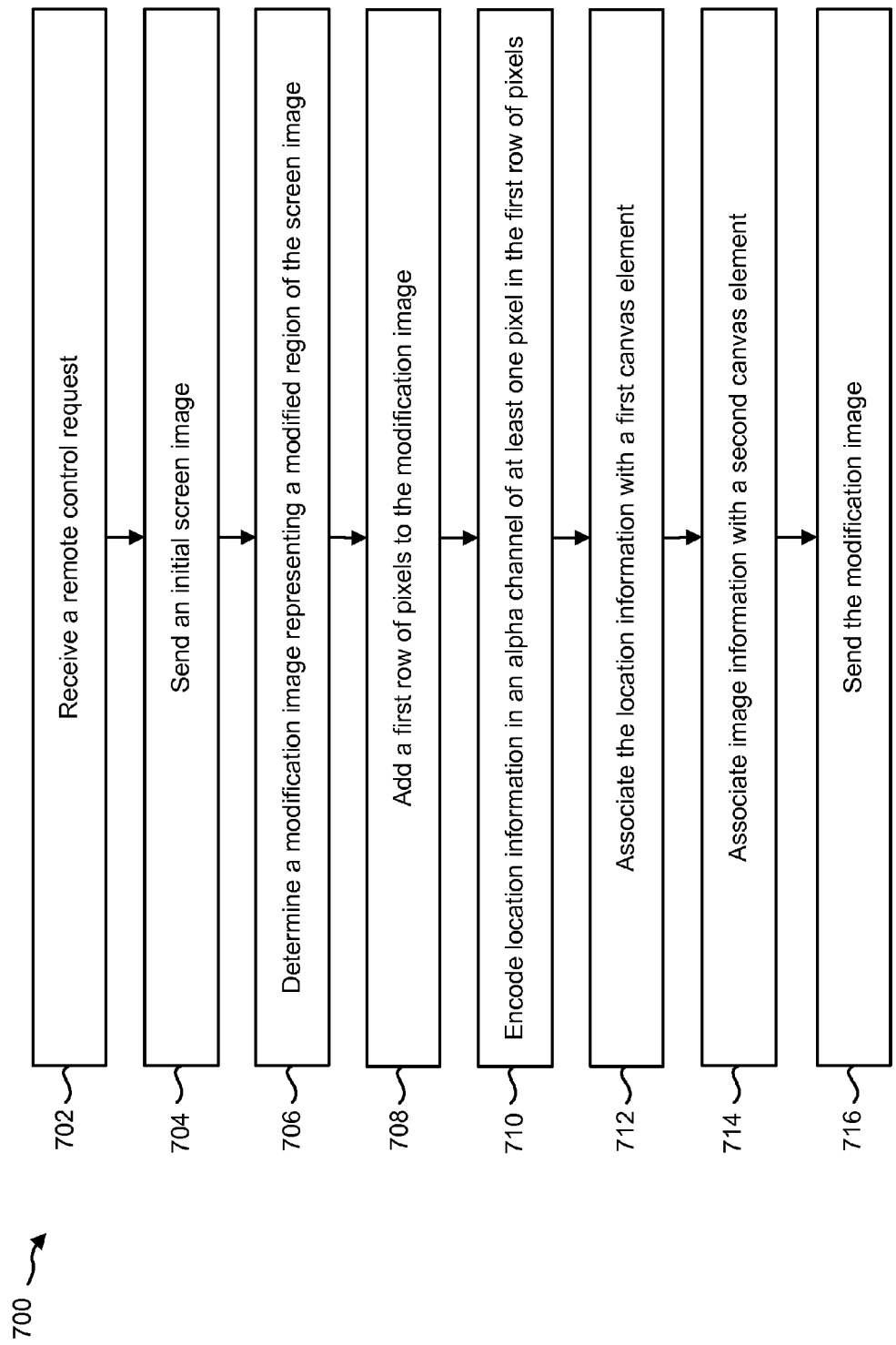
FIG. 7 is a flow diagram illustrating a more detailed configuration of a method for sending a screen image by a computing device.

FIG. 7 is a flow diagram illustrating a more detailed configuration of a method 700 for sending a screen image 106 by a computing device 102. In one configuration, the computing device 102 may be a remote computing device 102 as described above in connection with FIG. 1.

The computing device 102 may receive 702 a remote control request. In some implementations, the remote control request may be received 702 from a client computing device 104. For example, the client computing device 104 may send the remote control request to a URL or port number associated with the computing device 102. Upon receiving the remote control request, the computing device 102 may return a login screen to the client computing device 104. Login credentials (e.g., a username and password) may be provided to the computing device 102 to authenticate.

Upon validation of the login credentials, the computing device 102 may send 704 an initial screen image 638. The initial screen image 638 may represent the entire screen of the computing device 102. The initial screen image 638 may be a PNG image. The initial screen image 638 may be sent 704 to a web browser 124 on the client computing device 104.

The computing device 102 may determine 706 a modification image 112. The modification image 112 may represent a modified region of the screen image 106. In some implementations, this may be done as described in connection with FIG. 2. The modification image 112 may be a PNG image. The computing device 102 may also determine 706 which pixels 428 in the modification image 112 are unchanged from the screen image 106. The computing device 102 may send changed pixels 428 as opaque pixels 648 and unchanged pixels 428 as transparent pixels 646.

The computing device 102 may add 708 a first row of pixels 428 to the modification image 112. The first row of pixels 428 may be the same width as the other rows in the modification image 112.

The computing device 102 may encode 710 location information 116 in an alpha channel 114 of at least one pixel 428 in the first row of pixels 428. In some implementations, this may be done as described in connection with FIG. 2. The location information 116 may include a horizontal offset 642 and a vertical offset 644 for the modification image 112.

The computing device 102 may associate 712 the location information 116 with a first canvas element. The computing device 102 may also associate 714 image information 118 with a second canvas element. The first and second canvas elements may be HTML5 canvas elements. The first and second canvas elements may be components of a web page that displays the image information 118.

The computing device 102 may send 716 the modification image. For example, the computing device 102 may send 716 the modification image 112 to another computing device (e.g., client computing device) 104. In one configuration, the modification image 112 may be sent 716 as part of a web page. A web browser 124 may interpret HTML code and JavaScript code associated with the web page to determine where to display the modification image 112.

Figure 8:
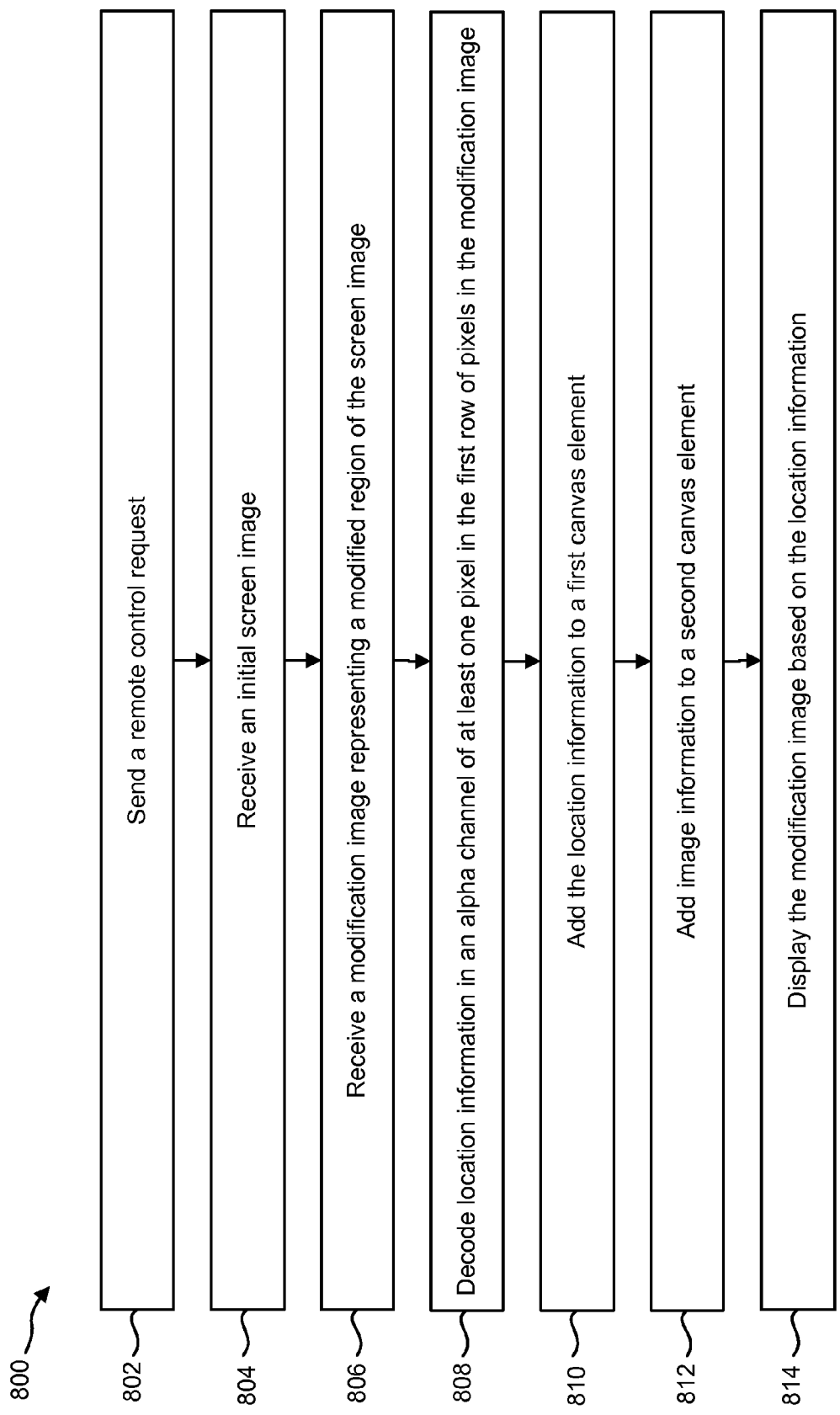
FIG. 8 is a flow diagram illustrating a more detailed configuration of a method for receiving a screen image by a computing device.

FIG. 8 is a flow diagram illustrating a more detailed configuration of a method 800 for receiving a screen image 106 by a computing device 104. In one configuration, the computing device 104 may be a client computing device 104 as described above in connection with FIG. 1. The computing device 104 may send 802 a remote control request. In some implementations, the remote control request may be sent 802 to a remote computing device 102. In one configuration, the remote computing device 102 may include a remote control agent that receives the remote control request. The computing device 104 may send 802 the remote control request to a URL or port number associated with the remote computing device 102. Upon receiving the remote control request, the remote computing device 102 may return a login screen to the computing device 104. The computing device 104 may then provide login credentials (e.g., a username and password) to the remote computing device 102 to authenticate.

If the login credentials are validated, the computing device 104 may receive 804 an initial screen image 638. The initial screen image 638 may represent the entire screen of the remote computing device 102. The initial screen image 638 may be a PNG image that may be displayed on the computing device 104.

The computing device 104 may receive 806 a modification image 112. For example, the computing device 104 may receive 806 the modification image 112 from the remote computing device 102. In one configuration, the computing device 104 may receive 806 the modification image 112 from the remote control agent on the remote computing device 102. The modification image 112 may represent a modified region of the screen image 106. The modification image 112 may be a PNG image. The modification image 112 may be compressed. Therefore, the computing device 104 may decompress the modification image 112. The computing device 104 may receive 806 changed pixels 428 as opaque pixels 648 and unchanged pixels 428 as transparent pixels 646.

The computing device 104 may decode 808 location information 116 in an alpha channel 114 of at least one pixel 428 in the first row of pixels 428 in the modification image 112. The first row of pixels 428 may be added to the modification image 112 by the remote computing device 102. The location information 116 may be embedded in an alpha channel 114 of at least one pixel 428 in the first row. The location information 116 may include a horizontal offset 642 and a vertical offset 644 for the modification image 112.

The computing device 104 may add 810 the location information 116 to a first canvas element. The computing device 104 may add 812 image information 118 to a second canvas element. This may be accomplished as described above in connection with FIG. 3. The first and second canvas elements may be components of a web page that may be received from the remote computing device 102. The first canvas element may be hidden and the second canvas element may be visible.

The computing device 104 may display 814 the modification image 112 based on the location information 814. The computing device 104 may interpret HTML code and/or JavaScript code included with the web page to determine where to display 814 the modification image 112. For example, the computing device 104 may obtain the horizontal offset 642 and the vertical offset 644 from the first canvas element. The computing device 104 may display 814 the second canvas element (containing the image information 118) based on the horizontal offset 642 and the vertical offset 644. For instance, the computing device 104 may display 814 the second canvas element at a distance from a reference position on the screen image 106 as indicated by the horizontal offset 642 and the vertical offset 644. Therefore, the computing device 104 may display 814 the second canvas element on top of the initial screen image 106 by positioning the second canvas element according to on the horizontal offset 642 and the vertical offset 644 included in the first canvas element.

Figure 9:
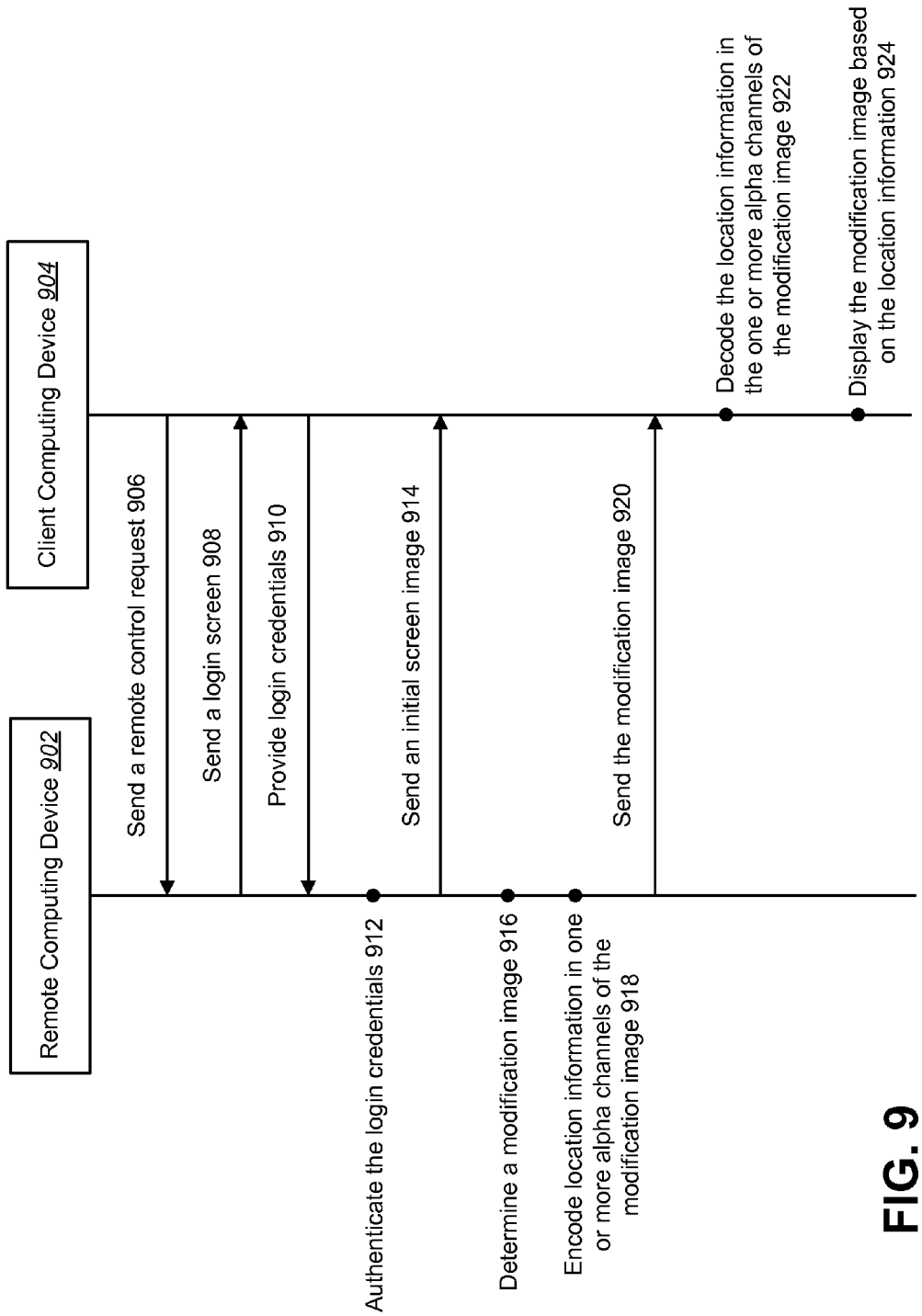
FIG. 9 is a thread diagram illustrating one configuration of a remote computing device and a client computing device sending and receiving a screen image.

FIG. 9 is a thread diagram illustrating one configuration of a remote computing device 902 and a client computing device 904 sending and receiving a screen image. The client computing device 904 sends 906 a remote control request to the remote computing device 902. In some implementations, this may be done as described in connection with FIG. 8.

The remote computing device 902 sends 908 a login screen to the client computing device 904. The client computing device 904 then provides 910 login credentials (e.g., a username and password) to the remote computing device 902 to authenticate. Upon authentication 912 of the login credentials, the remote computing device 902 sends 914 an initial screen image 638 to the client computing device 904. The initial screen image 638 may represent the entire screen of the remote computing device 902. The initial screen image 638 may be a PNG image.

The remote computing device 902 determines 916 a modification image 112. In some implementations, this may be done as described in connection with FIG. 2. The modification image 112 may represent a modified region of the screen image 106. The modification image 112 may be a PNG image.

The remote computing device 902 encodes 918 location information 116 in one or more alpha channels 114 of the modification image 112. In some implementations, this may be done as described in connection with FIG. 2. In one configuration, the location information 116 may include a horizontal offset 642 and a vertical offset 644 of the modification image 112 from a reference position on the screen image 106 (e.g., the initial screen image 638).

The remote computing device 902 sends 920 the modification image 112 to the client computing device 904. Upon receipt of the modification image 112, the client computing device 904 decodes 922 the location information 116 in one or more alpha channels 114 of the modification image 112. In some implementations, this may be done as described in connection with FIG. 3.

The client computing device 904 may display 924 the modification image 112 based on the location information 116. In some implementations, this may be done as described in connection with FIG. 3. For example, the client computing device 904 may display 924 the modification image 112 based on the horizontal offset 642 and the vertical offset 644 from the reference position on the screen image 106.

Figure 10:
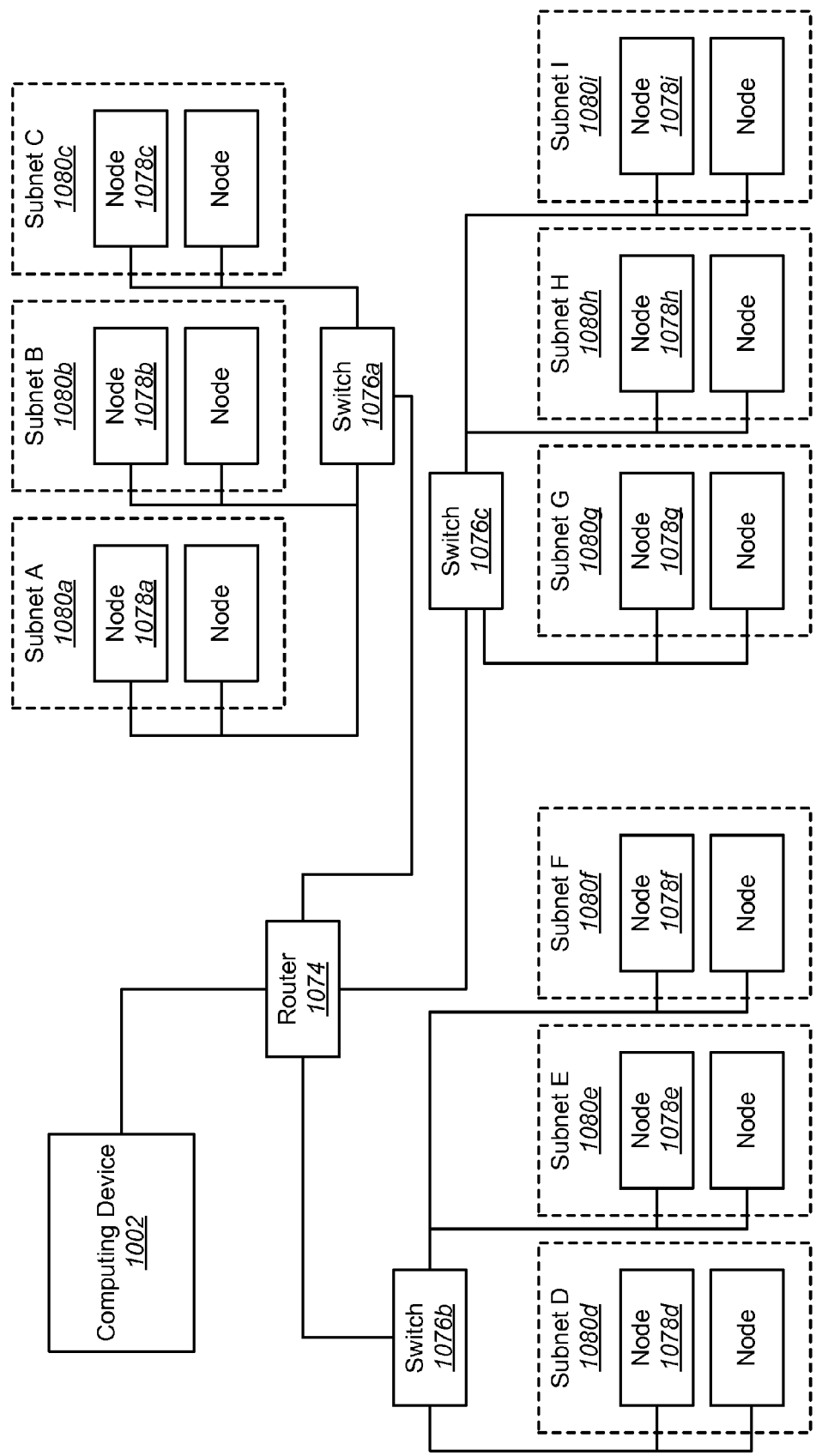
FIG. 10 is a block diagram that illustrates one configuration of a network where systems and methods for sending and receiving a screen image may be implemented.

FIG. 10 is a block diagram that illustrates one configuration of a network where systems and methods for sending and receiving a screen image 106 may be implemented. A computing device 1002 is connected to a router 1074. In FIG. 10, the computing device 1002 may be one example of one or more of the remote computing devices 102, 902 described above. The router 1074 is connected to switches 1076*a*, 1076*b* and 1076*c*. Switch 1076*a* is connected to several nodes 1078*a*, 1078*b*, 1078*c*, etc., via their respective subnets 1080*a*, 1080*b* and 1080*c*. The switch 1076*b* is connected to several nodes 1078*d*, 1078*e*, 1078*f* etc., via their respective subnets 1080*d*, 1080*e* and 1080*f*. The switch 1076*c* is connected to several nodes 1078*g*, 1078*h*, 1078*i*, etc., via their respective subnets 1080*g*, 1080*h*, 1080*i*. In FIG. 10, a node 1078 may be one example of one or more of the client computing devices 104, 904. Although FIG. 10 only shows one router 1074, and a limited number of switches 1076, subnets 1080 and nodes 1078, many and varied numbers of routers 1074, switches 1076, subnets 1080, and nodes 1078 may be included in networks and/or systems where systems and methods for determining differences between file system contents may be implemented.

Figure 11:
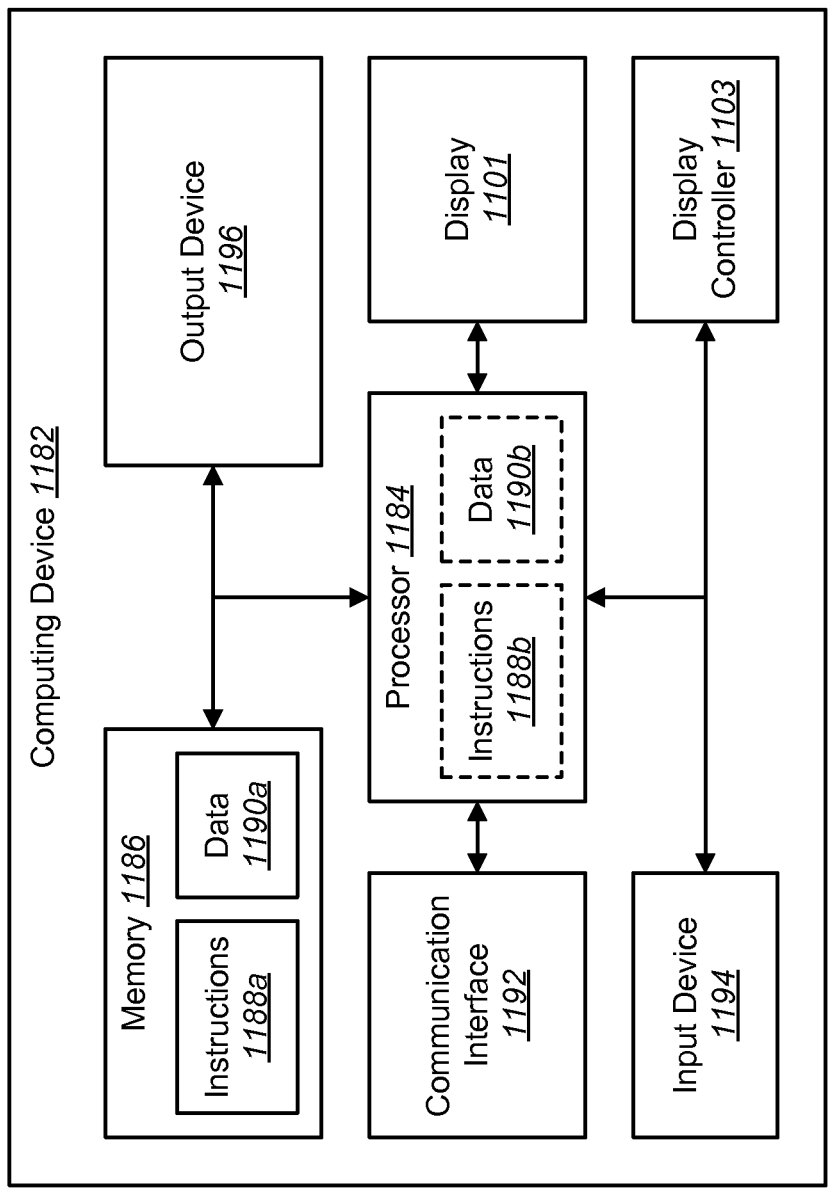
FIG. 11 illustrates various components that may be utilized on a computing device.

FIG. 11 illustrates various components that may be utilized on a computing device 1182. One or more of the computing devices 102, 104, 902, 904, 1002 and nodes 1078 described above may be implemented in accordance with the computing device 1182 illustrated in FIG. 11. For example, the computing device 1182 may be configured to perform one or more of the methods 200, 300, 700, 800 described above. The illustrated components may be located within the same physical structure or in separate housings or structures.

The computing device 1182 may include a processor 1184 and memory 1186. The processor 1184 controls the operation of the computing device 1182 and may be embodied as a microprocessor, a microcontroller, a digital signal processor (DSP) or other device known in the art. The memory 1186 may include instructions 1188a and data 1190a. The processor 1184 typically performs logical and arithmetic operations based on program instructions 1188a and data 1190a stored within the memory 1186. That is, instructions 1188b and data 1190b may be stored and/or run on the processor 1184. The instructions 1188a-b may be executable to perform one or more of the methods 200, 300, 700, 800 described above.

The computing device 1182 typically may include one or more communication interfaces 1192 for communicating with other electronic devices. The communication interfaces 1192 may be based on wired communication technology, wireless communication technology, or both. Examples of different types of communication interfaces 1192 include a serial port, a parallel port, a USB, an Ethernet adapter, an IEEE 1394 bus interface, a small computer system interface (SCSI) bus interface, an infrared (IR) communication port, a Bluetooth wireless communication adapter and so forth.

The computing device 1182 typically may include one or more input devices 1194 and one or more output devices 1196. Examples of different kinds of input devices 1194 include a keyboard, mouse, microphone, remote control device, button, joystick, trackball, touchpad, lightpen, etc. Examples of different kinds of output devices 1196 include a speaker, printer, etc. One specific type of output device 1196 that may be typically included in a computer system is a display device 1101. Display devices 1101 used with embodiments disclosed herein may utilize any suitable image projection technology, such as a cathode ray tube (CRT), liquid crystal display (LCD), light-emitting diode (LED), gas plasma, electroluminescence or the like. A display controller 1103 may also be provided for converting data stored in the memory 1186 into text, graphics and/or moving images (as appropriate) shown on the display device 1101.

It should be noted that FIG. 11 illustrates only one possible configuration of a computing device wherein systems and methods for determining a group based on a relationship may be performed. Various other architectures and components may be utilized.

In the above description, reference numbers have sometimes been used in connection with various terms. Where a term is used in connection with a reference number, this is meant to refer to a specific element that is shown in one or more of the Figures. Where a term is used without a reference number, this is meant to refer generally to the term without limitation to any particular Figure.

As used herein, the term "close to" and other variations thereof may mean that a low latency link exists between the two devices that are "close to" each other. For example, a low latency link may be a local area network that may cover a limited geographical area (e.g., home, office, computer laboratory, building, etc.).

As used herein, the term "agent" and other variations thereof may refer to software and/or hardware that is/are used to manage and/or perform operations on a managed computing device. For example, the agent may receive and perform instructions from an administrative system. For instance, the agent may uninstall software, eliminate threats (e.g., viruses, Trojans, worms, malware, adware, spyware, etc.), report information to the administrative system (e.g., usage reports, status, etc.), update firmware, detect unauthorized use, detect unauthorized products on the managed computing device, etc.

As used herein, the term "coupled" and other variations thereof may mean that one element is connected to another element directly or indirectly. For example, if a first element is coupled to a second element, the first element may be connected directly to the second element or may be connected to the second element through another element.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. It should be noted that a computer-readable medium may be non-transitory and tangible. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method(s). The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A method for sending a screen image by a computing device, comprising:
   determining a modification image representing a modified region of the screen image, wherein the modification image has a lossless format;
   encoding location information in one or more alpha channels of the modification image, wherein the location information indicates a location of the modification image relative to the screen image; and
   sending the modification image.

2. The method of claim 1, wherein the encoding comprises encoding location information in a first row of pixels in the modification image.

3. The method of claim 2, wherein the location information is encoded in an alpha channel of at least one pixel in the first row.

4. The method of claim 2, wherein the first row of pixels is added to the modification image, and wherein color components for each pixel in the first row are set to zero.

5. The method of claim 1, wherein the encoding further comprises:
   associating the location information with a first canvas element; and
   associating image information with a second canvas element.

6. The method of claim 1, wherein the location information comprises a horizontal offset and a vertical offset of the modification image relative to the screen image.

7. The method of claim 1, wherein the modification image is a portable network graphics (PNG) image.

8. The method of claim 1, further comprising:
   determining which pixels are unchanged in the screen image; and
   sending changed pixels as opaque pixels and unchanged pixels as transparent pixels.

9. The method of claim 1, wherein the method is performed by a web server.

10. The method of claim 9, wherein the web server comprises a remote control agent.

11. A method for receiving a screen image by a computing device, comprising:
    receiving a modification image representing a modified region of the screen image, wherein the modification image has a lossless format;
    decoding location information in one or more alpha channels of the modification image wherein the location information indicates a location of the modification image relative to the screen image; and
    displaying the modification image based on the location information.

12. The method of claim 11, wherein the decoding comprises decoding location information in a first row of pixels in the modification image.

13. The method of claim 12, wherein the location information is decoded from an alpha channel of at least one pixel in the first row.

14. The method of claim 12, wherein the first row of pixels is added to the modification image, and wherein color components for each pixel in the first row are set to zero.

15. The method of claim 11, wherein the decoding further comprises:
    adding the location information to a first canvas element; and
    adding image information to a second canvas element.

16. The method of claim 11, wherein the location information comprises a horizontal offset and a vertical offset of the modification image relative to the screen image.

17. The method of claim 11, wherein the modification image is a portable network graphics (PNG) image.

18. The method of claim 11, further comprising receiving changed pixels as opaque pixels and unchanged pixels as transparent pixels.

19. The method of claim 11, wherein the method is performed by a web browser.

20. The method of claim 11, wherein the modification image is received from a remote control agent.

21. A computing device for sending a screen image comprising:
    a processor;
    a memory in electronic communication with the processor; and
    instructions stored in the memory, the instructions being executable to:
    determine a modification image representing a modified region of the screen image, wherein the modification image has a lossless format;
    encode location information in one or more alpha channels of the modification image wherein the location information indicates a location of the modification image relative to the screen image; and
    send the modification image.

22. The computing device of claim 21, wherein the instructions executable to encode comprise instructions executable to encode location information in a first row of pixels in the modification image.

23. The computing device of claim 22, wherein the first row of pixels is added to the modification image, and wherein color components for each pixel in the first row are set to zero.

24. The computing device of claim 21, wherein the instructions executable to encode are further executable to:

associate the location information with a first canvas element; and associate image information with a second canvas element.

25. A computing device for receiving a screen image, comprising:

a processor;

a memory in electronic communication with the processor;

instructions stored in the memory, the instructions being executable to:

receive a modification image representing a modified region of the screen image, wherein the modification image has a lossless format;

decode location information in one or more alpha channels of the modification image wherein the location information indicates a location of the modification image relative to the screen image; and display the modification image based on the location information.

26. The computing device of claim 25, wherein the instructions executable to decode comprise instructions executable to decode location information in a first row of pixels in the modification image.

27. The computing device of claim 26, wherein the first row of pixels is added to the modification image, and wherein color components for each pixel in the first row are set to zero.

28. The computing device of claim 25, wherein the instructions executable to decode are further executable to:

add the location information to a first canvas element; and add image information to a second canvas element.

* * * * *